US012152443B2

(12) United States Patent
Parker

(10) Patent No.: US 12,152,443 B2
(45) Date of Patent: Nov. 26, 2024

(54) EXTENSION LADDER WITH LOCAL REINFORCEMENT

(71) Applicant: Werner Co., Greenville, PA (US)

(72) Inventor: Thomas W. Parker, Jamestown, PA (US)

(73) Assignee: Werner Co., Greenville, PA (US)

( * ) Notice: Subject to any disclaimer, the term of this patent is extended or adjusted under 35 U.S.C. 154(b) by 587 days.

(21) Appl. No.: 16/397,679

(22) Filed: Apr. 29, 2019

(65) Prior Publication Data

US 2020/0340301 A1 Oct. 29, 2020

(51) Int. Cl.

*E06C 7/10* (2006.01)
*E06C 1/12* (2006.01)
*E06C 7/50* (2006.01)

(52) U.S. Cl.

CPC .................. *E06C 7/10* (2013.01); *E06C 1/12* (2013.01); *E06C 7/50* (2013.01)

(58) Field of Classification Search

CPC ..... E06C 1/12; E06C 7/10; E06C 7/50; E06C 7/083

See application file for complete search history.

(56) References Cited

U.S. PATENT DOCUMENTS 786,658 A * 4/1905 Merrill ...................... E06C 1/12 182/209
1,036,932 A * 8/1912 Thompson ................ E06C 1/10 182/178.2
1,228,248 A * 5/1917 Rudd ........................ E06C 1/32 182/24
1,961,781 A * 6/1934 Reagle .................... E06C 7/083 182/228.3
2,594,070 A * 4/1952 Reagle .................... E06C 7/083 182/220
2,885,132 A * 5/1959 Campbell ................. E06C 7/08 182/46
3,365,023 A * 1/1968 Nagle ....................... E06C 1/12 182/211
3,464,521 A * 9/1969 Popoli ...................... E06C 1/12 182/207
3,522,933 A * 8/1970 Braun ................... E04F 11/181 256/22
3,674,110 A * 7/1972 Cooke ....................... E06C 7/08 182/46
3,858,684 A * 1/1975 Goings ..................... E06C 7/46 182/207

(Continued)

FOREIGN PATENT DOCUMENTS

GB 470152 A * 8/1937 ............... E06C 1/12

*Primary Examiner* — Colleen M Chavchavadze

(74) *Attorney, Agent, or Firm* — Fitch, Even, Tabin & Flannery LLP

(57) ABSTRACT

An extension ladder having a base section and a fly section. The fly section has a right local reinforcement disposed inside a right fly rail of the fly section at locations of highest bending moment of the right fly rail when a force is applied to the right fly rail. The right local reinforcement is shorter than a length of the right fly rail. Loads applied to the right fly rail are transmitted to the right local reinforcement so the right fly rail may be thinner than if there was no right local reinforcement present. A method for producing a ladder rail with a local reinforcement between a top rail flange and a bottom rail flange. A method for using an extension ladder.

17 Claims, 13 Drawing Sheets

(56) References Cited

U.S. PATENT DOCUMENTS

| | | | | | |
|---|---|---|---|---|---|
| 3,948,353 | A * | 4/1976 | Lane | E06C 7/48 | 182/206 |
| 3,970,170 | A * | 7/1976 | Darling | E06C 1/12 | 182/230 |
| 3,997,027 | A * | 12/1976 | Patterson | E06C 1/381 | 182/195 |
| 4,029,172 | A * | 6/1977 | Green | B29C 70/085 | 182/46 |
| 4,060,150 | A * | 11/1977 | Hughes | E06C 7/50 | 182/178.3 |
| 4,802,643 | A * | 2/1989 | Uys | H02G 3/0456 | 182/228.6 |
| 4,917,216 | A * | 4/1990 | Kimber | E06C 1/10 | 182/151 |
| 4,998,982 | A * | 3/1991 | Arnold | E06C 1/12 | 182/107 |
| 5,350,038 | A * | 9/1994 | Lazarus | E06C 1/12 | 182/163 |
| 6,269,909 | B1 * | 8/2001 | Grimes | E06C 1/12 | 182/129 |
| 6,505,707 | B1 * | 1/2003 | Berry | A01M 31/025 | 182/116 |
| 6,591,942 | B2 * | 7/2003 | Branca | B29C 65/02 | 182/228.1 |
| 7,086,499 | B2 * | 8/2006 | Moss | E06C 1/32 | 182/167 |
| 8,602,164 | B2 * | 12/2013 | Allred, III | F16B 7/042 | 182/194 |
| 11,091,957 | B2 * | 8/2021 | Voss | E06C 7/08 | |
| 2007/0163838 | A1 * | 7/2007 | Kim | E06C 1/32 | 182/178.4 |
| 2016/0265278 | A1 * | 9/2016 | Jeffrey | E06C 7/10 | |

* cited by examiner

EXTENSION LADDER WITH LOCAL REINFORCEMENT

FIELD OF THE INVENTION

The present invention is related to reinforcement in ladder rails in the areas where the highest stress occurs. (As used herein, references to the "present invention" or "invention" relate to exemplary embodiments and not necessarily to every embodiment encompassed by the appended claims.) More specifically, the present invention is related to reinforcement in ladder rails in the areas where the highest stress occurs where local reinforcement is at least in the location of a rail where a bending moment on the rail during Ultimate Load testing is just less than the bending moment that would break the rail.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

It is desired in regard to climbing products, such as ladders, that they be as strong as possible to support the load of user climbing up on them so they do not fail and cause the user to fall off and be injured, yet be as light as possible so they can be easily carried to a desired location for use. In order to make ladders strong enough to support a user, commonly the entire component of the ladder, such as the rail or the rung, is made thick enough to support the desired loads. However, in most instances certain portions of the rail do not experience as high loads as other portions, so such certain portions do not need to be as thick as the other portions that do experience the higher loads. It would save material and thus weight and thus make the rail lighter if only the portions that experienced the higher loads had more material to support the higher loads.

BRIEF SUMMARY OF THE INVENTION

The present invention pertains to an extension ladder. The ladder comprises a base section having a right base rail and a left base rail in parallel and spaced relation with the right base rail, and base rungs attached to and between the right base rail and the left base rail. The ladder comprises a fly section having a right fly rail and a left fly rail in parallel in spaced relation with the right fly rail, and fly rungs attached to and between the right fly rail and the left fly rail. The fly section comprises a right local reinforcement disposed inside the right fly rail extending between adjacent a bottom of the right fly rail and an upper portion of the right fly rail below the top of the right fly rail. The right local reinforcement is a separate piece from the right fly rail. The loads applied to the right fly rail are transmitted to the right local reinforcement. The ladder comprises guide brackets attached to the base section which hold the base section and fly section together and allow the fly section to slide relative to the base section.

The present invention pertains to a method for producing a ladder rail. The method comprises the steps of positioning a local reinforcement between a top rail flange and a bottom rail flange. The local reinforcement shorter than a length of the rail. There is the step of placing a rung through a reinforcement hole in the local reinforcement and a web hole in the rail. The reinforcement hole and the web hole in alignment. The web attached to the top and bottom rail flanges.

The present invention pertains to a method for using an extension ladder. The method comprises the steps of placing the ladder at a desired location. There is the step of moving a fly section relative to a base section of the ladder so the ladder is in an extended position. The base section having a right base rail and a left base rail in parallel and spaced relation with the right base rail, and base rungs attached to and between the right base rail and the left base rail. The fly section having a right fly rail and a left fly rail in parallel in spaced relation with the right fly rail, and fly rungs attached to and between the right fly rail and the left fly rail. A right local reinforcement disposed inside the right fly rail extending between adjacent a bottom of the right fly rail and an upper portion of the right fly rail below the top of the right fly rail. The right local reinforcement a separate piece from the right fly rail. The loads applied to the right fly rail transmitted to the right local reinforcement. The ladder having guide brackets attached to the base section which hold the base section and fly section together and allow the fly section to slide relative to the base section.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
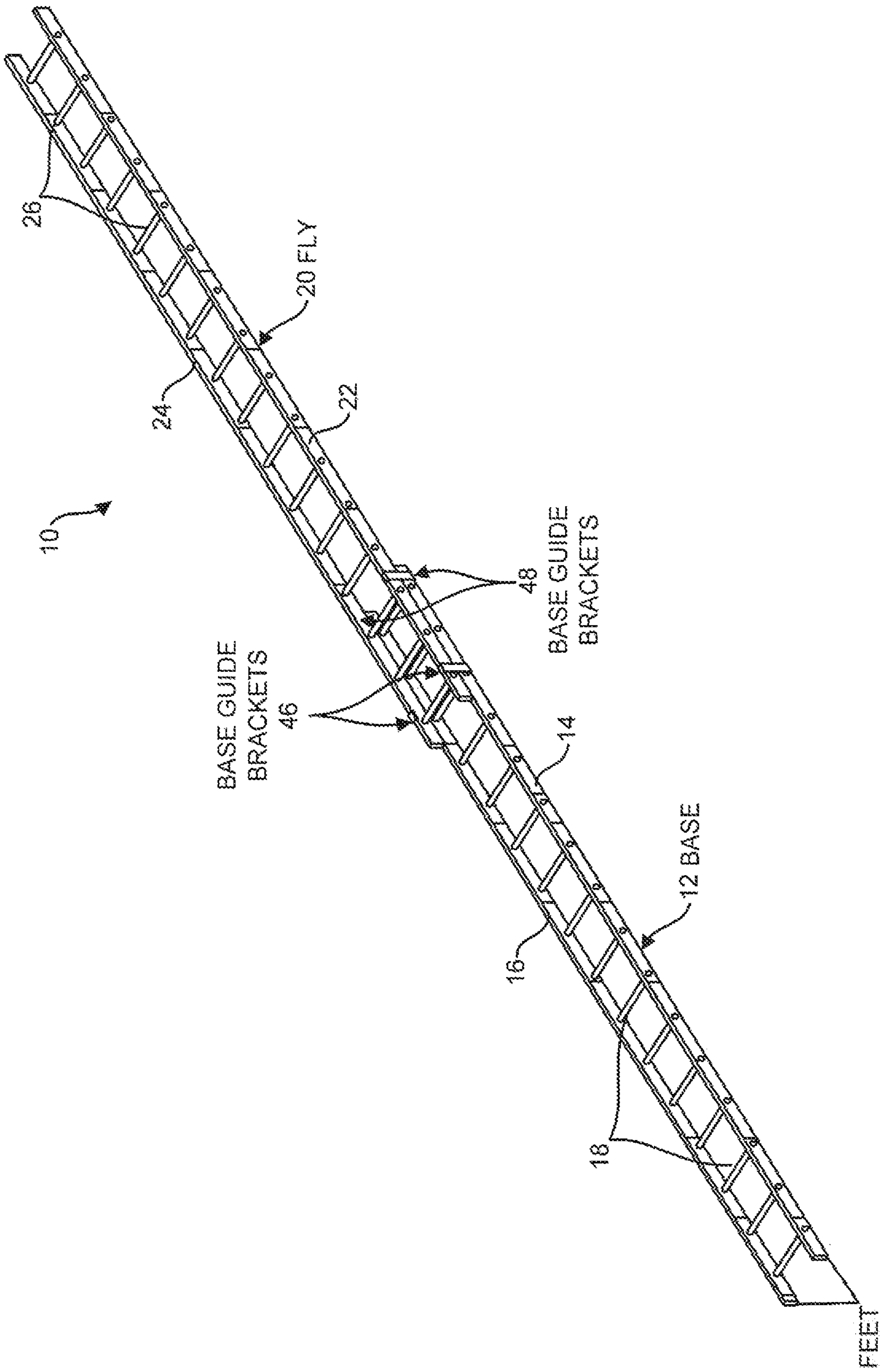
FIG. 1 shows an extension ladder the fully extended position.
Figure 3:
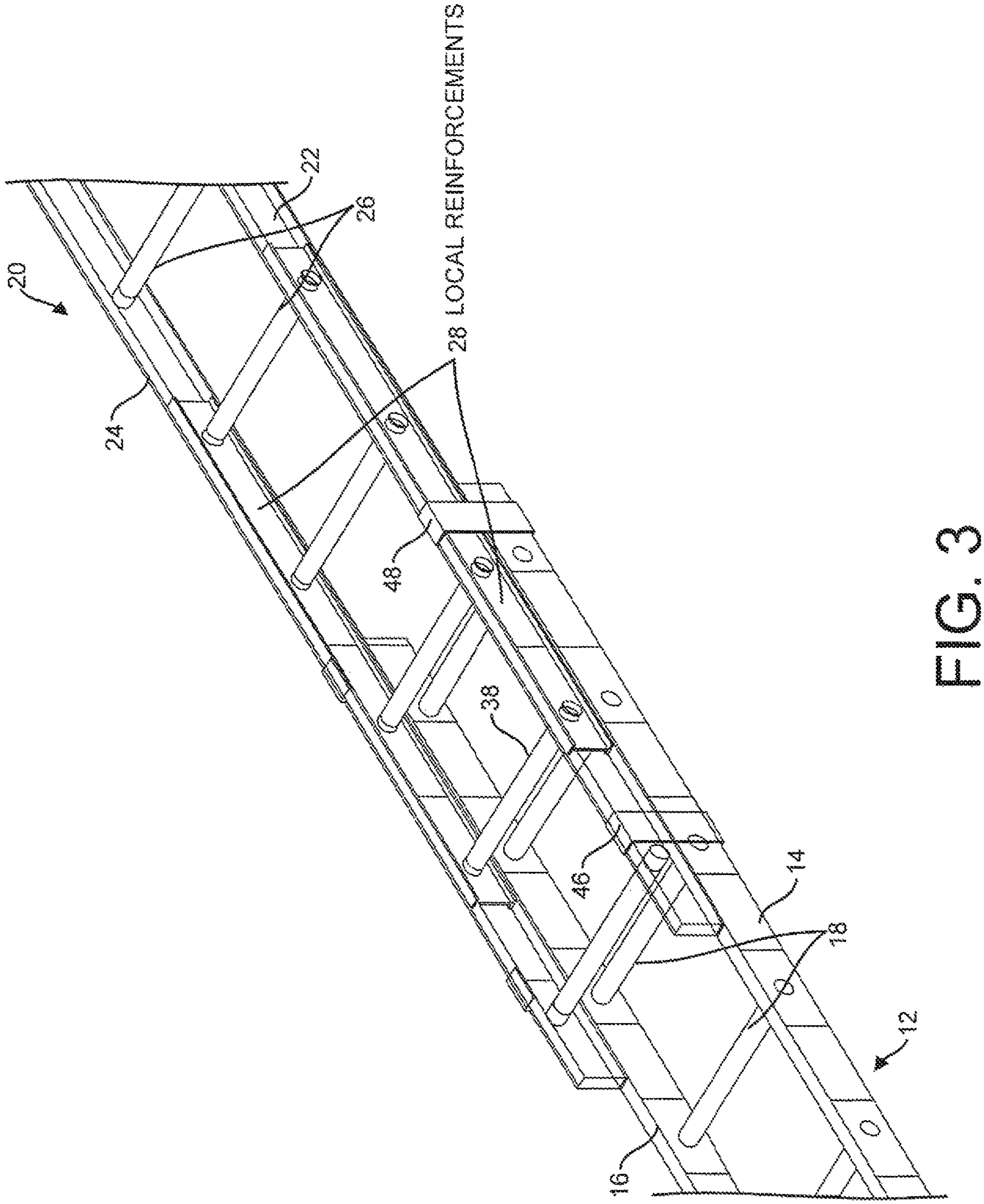
FIG. 3 shows a portion of an extension ladder with local reinforcement and the rails.
Figure 4A:
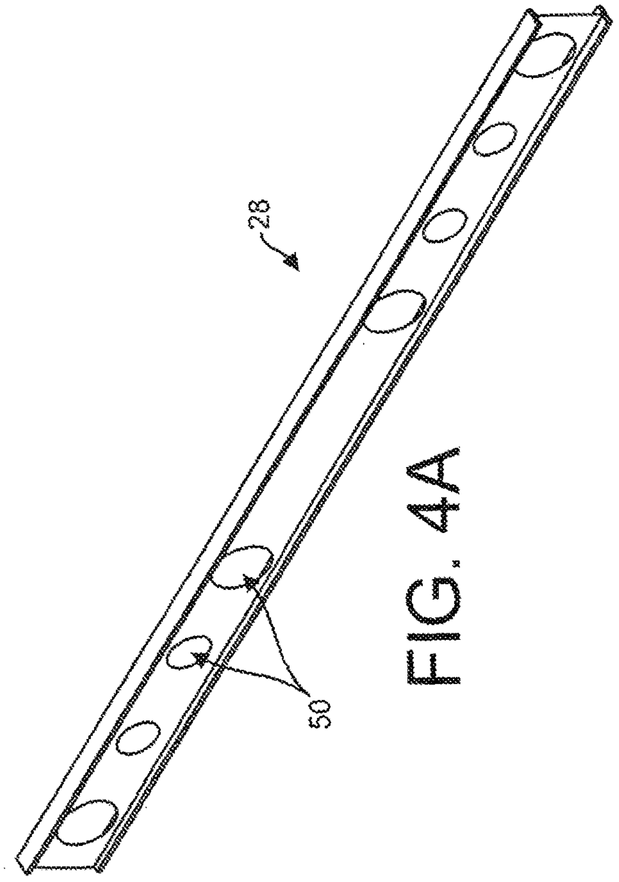
FIG. 4A is a perspective view of a local reinforcement.
Figure 4B:
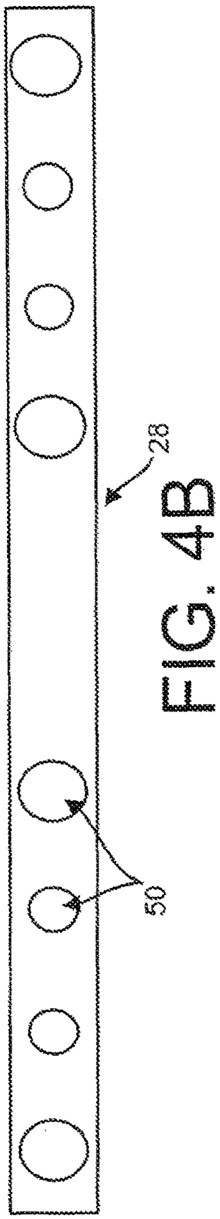
FIG. 4B is a side view of the local reinforcement.
Figure 4C:
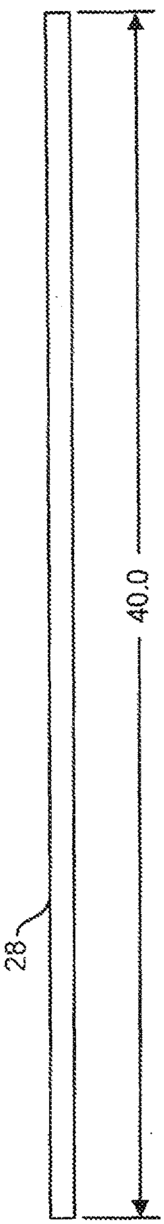
FIG. 4C is a side edge view of the local reinforcement.
Figure 4D:
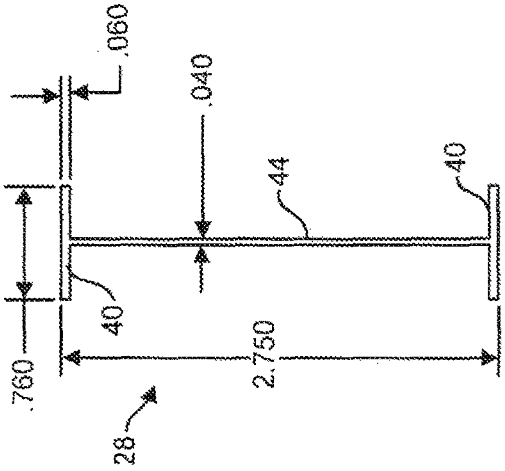
FIG. 4D is an end view of the local reinforcement.

Referring now to the drawings wherein like reference numerals refer to similar or identical parts throughout the several views, and more specifically to FIGS. 1 and 3 thereof, there is shown an extension ladder 10. The ladder comprises a base section 12 having a right base rail 14 and a left base rail 16 in parallel and spaced relation with the right base rail 14, and base rungs 18 attached to and between the right base rail 14 and the left base rail 16. The ladder comprises a fly section 20 having a right fly rail 22 and a left fly rail 24 in parallel in spaced relation with the right fly rail 22, and fly rungs 26 attached to and between the right fly rail 22 and the left fly rail 24. The right fly rail 22 has a hollow box cross-section or a C cross-section or an I cross-section. The fly section 20 comprises a right local reinforcement 28 disposed inside the right fly rail 22 extending between a bottom of the right fly rail 22 and an upper portion of the right fly rail 22 below the top of the right fly rail 22. The right local reinforcement 28 is a separate piece from the right fly rail 22. The loads applied to the right fly rail 22 are transmitted to the right local reinforcement 28. The ladder comprises guide brackets attached to the base section 12, and if the right fly rail 22 has a hollow box cross-section, the fly section 20, which hold the base section 12 and fly section 20 together and allow the fly section 20 to slide relative to the base section 12.

The right local reinforcement 28 may have a top which is adjacent a top flange of the right fly rail 22 and a bottom which is adjacent a bottom flange of the right fly rail 22. The right fly rail 22 has a left web 34, and if the right fly rail 22 has a hollow box cross-section, a right web 36 in spaced relation with the left web 34. The top flange is attached to the left web 34, and if the right fly rail 22 has a hollow box cross-section, the right web 36. The bottom flange is connected to the left web 34, and if the right fly rail 22 has a hollow box cross-section, the right web 36, and the left web 34 is in spaced relation with the right web 36 if the right fly rail 22 has a hollow box cross-section. The ladder may include a first fly rung 38 of the plurality of fly rungs 26. The first fly rung 38 extends through the left web 34 and the right local reinforcement 28, and into the right web 36 if the right fly rail 22 has a hollow box cross-section. The right local reinforcement 28 is inserted into the right fly rail 22 first during production, and then the first fly rung 38 is inserted typically through holes in the left web 34, the right local reinforcement 28, and the right web 36 if the right fly rail 22 has a hollow box cross-section, and expands, as is well known in the art, to permanently fix in place the first fly rung 38 with the right fly rail 22. The right fly rung does not have to be permanently fixed to the local reinforcement, but can extend loosely through a hole in the center portion 44 of the local reinforcement to maintain the local reinforcement in place in the right fly rung. Similarly, all base rungs 18 are permanently attached to the right and left base rails and all fly rungs 26 are permanently attached to the right and left fly rails 22, 24 in this way, whether there is local reinforcement present at the point of connection or not.

The right local reinforcement top may be a right top flange 40 and the right local reinforcement bottom may be a right bottom flange 42, and the right local reinforcement 28 may have a center element 44 attached to and between the right top flange 40 and the right bottom flange 42. The right local reinforcement 28 may have a cross-sectional shape of an I if the right fly rail 22 has a hollow box cross-section, or a cross-sectional shape of a C if the right fly rail 22 a C or I cross-section. The guide brackets may include a right fly guide bracket 46 attached to the right fly rail 22 and which holds the right base rail 14 if the right fly rail 22 has a hollow box cross-section, and a right base guide bracket attached 48 to the right base rail 14 and holds the right fly rail 22.

The right local reinforcement 28 extends at least from D to six inches past the right base guide toward a lower end of the right fly rail 22 when the ladder 10 is upright. D is a location where a desired maximum moment is not to be exceeded on the right fly rail, and is found at L4. L4=distance from a fly support B of the horizontally supported ladder to the location D on the right fly rail and is determined by L4=(maximum moment)/((F×L2)/L1). F=a vertical force applied to the ladder which is horizontally supported, L2=distance from a base support A of the horizontally supported ladder to a location where the vertical force F is applied, L1=distance between the supports A and B of the horizontally supported ladder, and where ((F×L2)/L1)×L4 gives a bending moment (in inch-pounds) at location D, F is in pounds and L1, L2, and L4 are in inches.

The right local reinforcement 28 may be between 30 inches and 50 inches long and preferably about 40 inches long. The right fly rail 22 is a 3-inch box rail and the ladder is either a 28 foot type IAA ladder or a 32 foot type IA ladder, or a 3.5 inch box rail and the ladder is a 32 foot type IAA ladder.

The present invention pertains to a method for producing a ladder rail. The method comprises the steps of positioning a local reinforcement between a top rail flange 30 and a bottom rail flange 32. The local reinforcement shorter than a length of the rail. There is the step of placing a rung through a reinforcement hole in the local reinforcement and a web hole in the rail. The reinforcement hole and the web hole in alignment. The web attached to the top and bottom rail flanges 30, 32.

The present invention pertains to a method for using an extension ladder 10. The method comprises the steps of placing the ladder 10 at a desired location. There is the step of moving a fly section 20 relative to a base section 12 of the ladder so the ladder is in an extended position. The base section 12 having a right base rail 14 and a left base rail 16 in parallel and spaced relation with the right base rail 14, and base rungs attached to and between the right base rail 14 and the left base rail 16. The fly section 20 having a right fly rail 22 and a left fly rail 24 in parallel in spaced relation with the right fly rail 22, and fly rungs 26 attached to and between the right fly rail 22 and the left fly rail 24. A right local reinforcement 28 disposed inside the right fly rail 22 extending between adjacent a bottom of the right fly rail 22 and an upper portion of the right fly rail 22 below the top of the right fly rail 22. The right local reinforcement 28 a separate piece from the right fly rail 22. The loads applied to the right fly rail 22 transmitted to the right local reinforcement 28. The ladder 10 having guide brackets attached to the base section 12, and the fly section 20 of the right fly rail 22 has a hollow box cross-section, which hold the base section 12 and fly section 20 together and allow the fly section 20 to slide relative to the base section 12.

In the operation of the invention, reinforcement is provided in ladder rails in the areas where the highest stress occurs. By adding local reinforcement to a rail ideally only where it is needed, the rest of the rail can be kept lighter, using less material and therefore having a lower cost. For example, a rail profile which works on a Type IA ladder could be used in the construction of a Type IAA ladder. Or, a rail profile which works on a 24-foot ladder could be used on a 28 foot or possibly a 32-foot ladder.

FIG. 1 shows a simplified representation of a 32-foot extension ladder having hollow FG rails. The fly and base sections are each about 16 feet long. The fly guide brackets are attached to the fly and the base guide brackets are attached to the base. These guide brackets hold the fly close to the base yet permit the fly to slide along the base when extending or collapsing the ladder. The ladder is shown in its fully extended position. The usual ladder locks and feet are not shown.

Figure 2A:
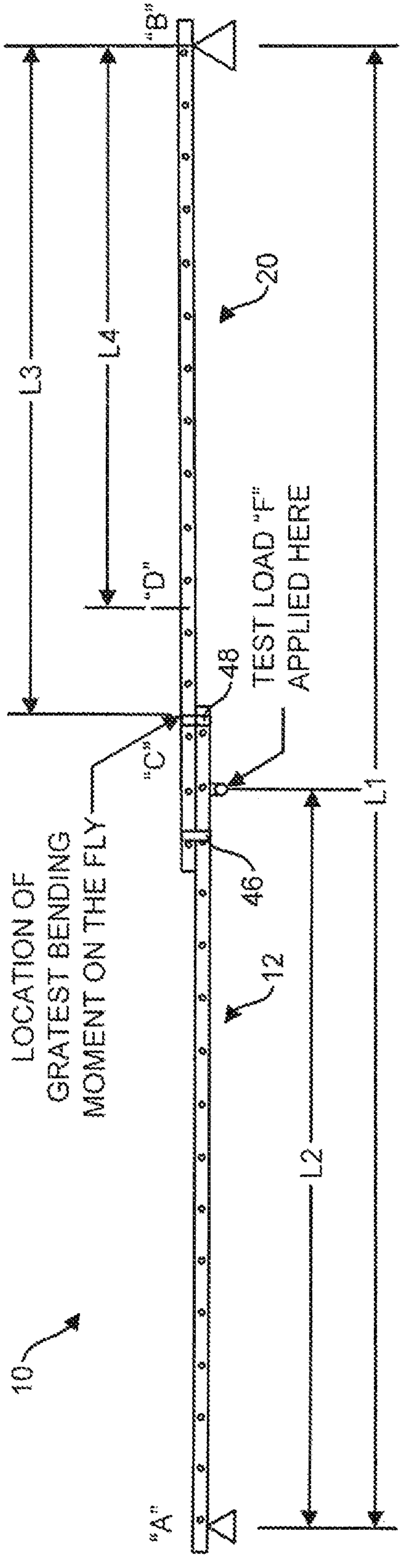
FIG. 2A is a side view of an extension ladder having a test load F applied to it.
Figure 2B:
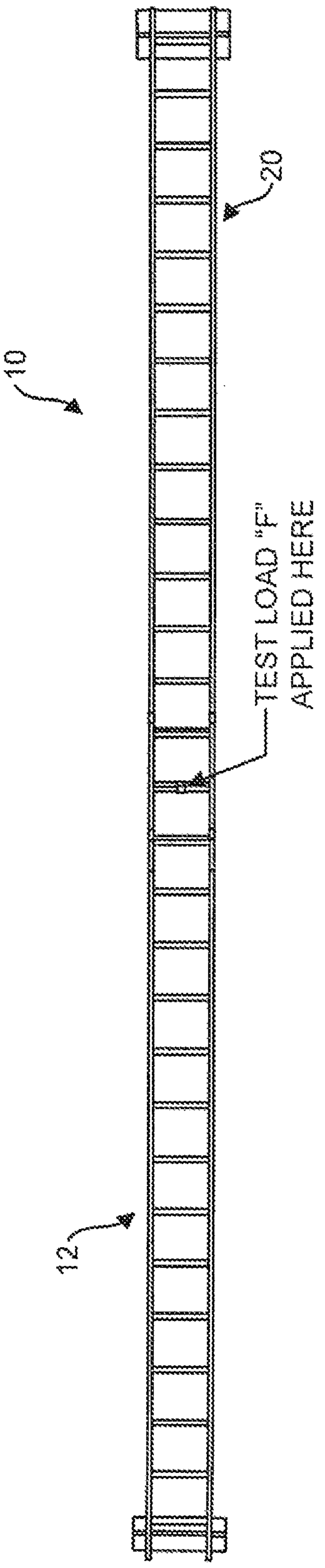
FIG. 2B is an overhead view of the extension ladder having the test load F applied to it.

FIGS. 2A and 2B show the extension ladder 10 supported at each end as when subjected to the ANSI A14.5-2017 paragraph 8.3.1.2 Ultimate Load test. In this test a load F is applied downward where shown. When the load is applied the maximum bending moment will occur at the point C which is at the edge of the base guide brackets. The bending moment equals ((F×L2)/L1)×L3, where L3 is the distance from B to the maximum bending moment. The bending moment is maximum at point C and decreases linearly at positions along the rail to the right of point C, becoming zero at point B.

If the ladder breaks while undergoing the Ultimate Load test due to stresses produced by the max bending moment at C, one solution might be to strengthen the entire fly rail by adding material to the rail profile. This will result in the rail being excessively strong (and therefore unnecessarily heavy) for most of its length.

FIG. 3 shows the solution provided by this invention. The fly section 20 is shown in phantom so that the local reinforcements within the fly rails may be seen.

FIGS. 4A-4D show a local reinforcement in detail. It is designed to fit closely within the box profile of the rail. It might have an I shape profile as shown or could be a C channel or have a box shape cross section. The local reinforcement may have reinforcement holes 50 as shown to permit rungs to be installed in the rails, in which case the local reinforcements would be inserted into the rails prior to the rungs.

The center element 44 of the right local reinforcement is about 0.040 inches thick, the top rail flange 30 and the bottom rail flange 32 are about 0.060 inches thick and about 0.76 inches wide. The right local reinforcement is about 2.75 inches high. A 3 inch and a 3.5-inch hollow box rail has a left and right web which is about 0.060 inches thick and the top and bottom rail flanges are about 0.125 inches thick.

The right fly rail 22 without the right local reinforcement 28 has a compressive stress of 30K psi at the right base guide bracket 50 which will cause the right fly rail 22 to break. But on the right fly rail 22 with the right local reinforcement 28, the compressive stress at the right base guide bracket 50 is reduced to 20K psi and has a maximum value at the end of the right base guide bracket 50 of only 27K psi.

Figure 5:
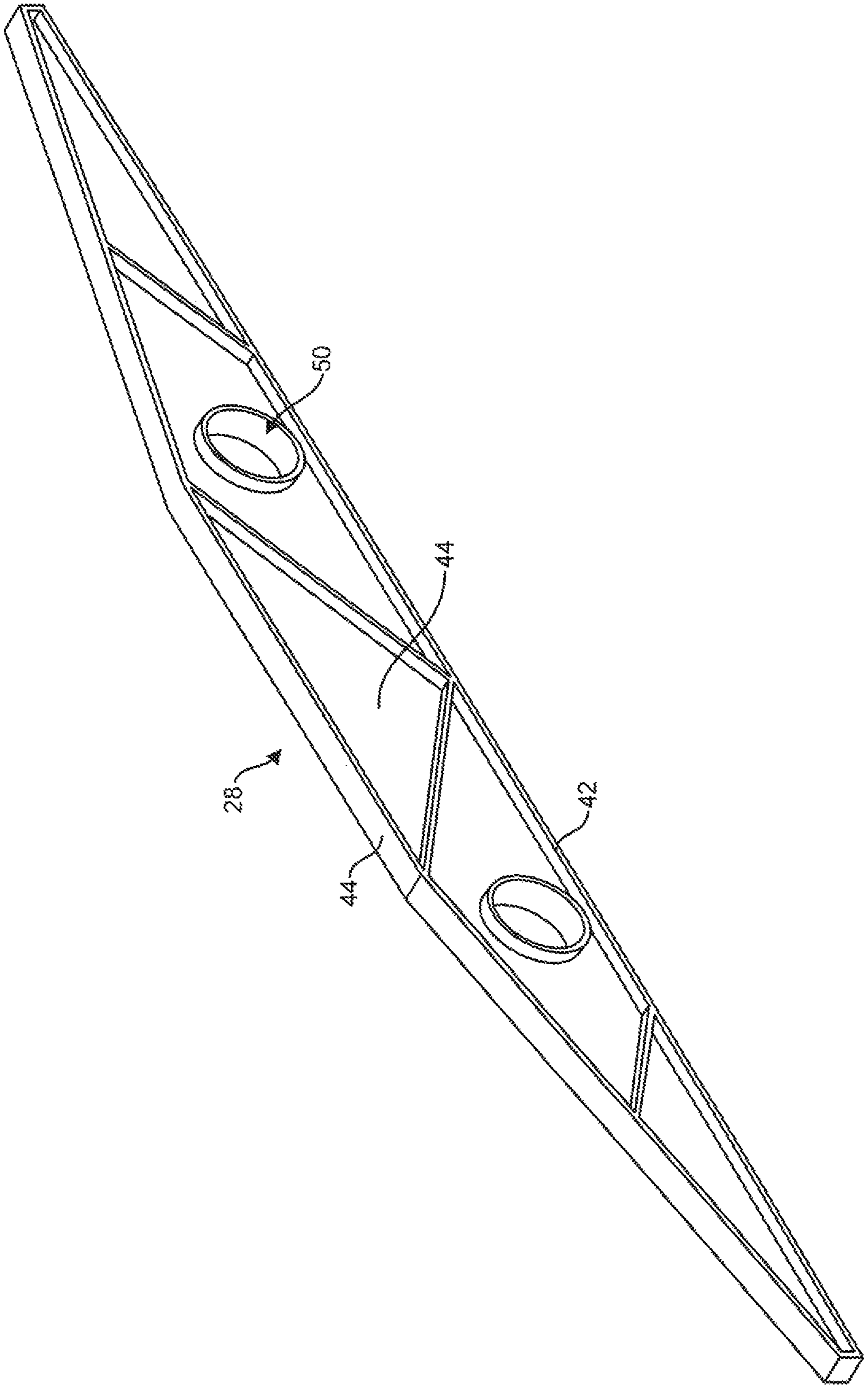
FIG. 5 is an alternative embodiment of a local reinforcement.
Figure 6:
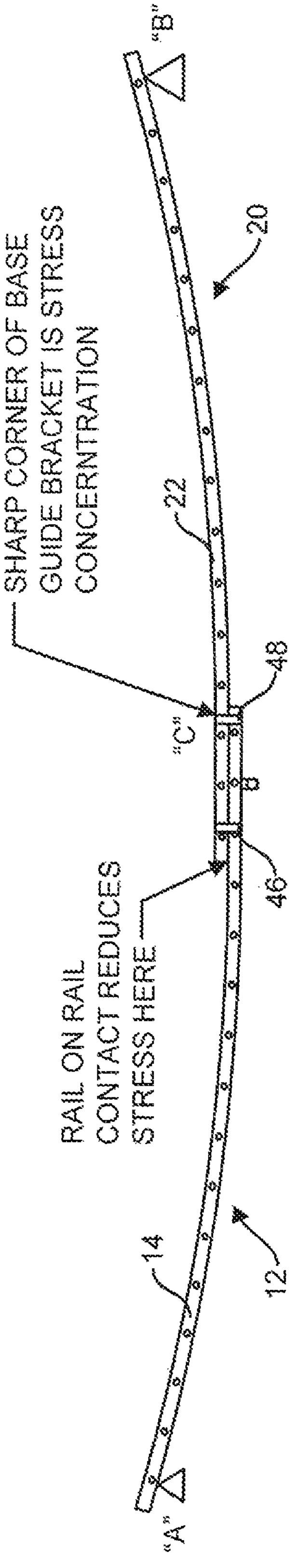
FIG. 6 is a side view of the extension ladder bowed down with a load force F applied to it in regard to FIG. 2A.
Figure 7A:
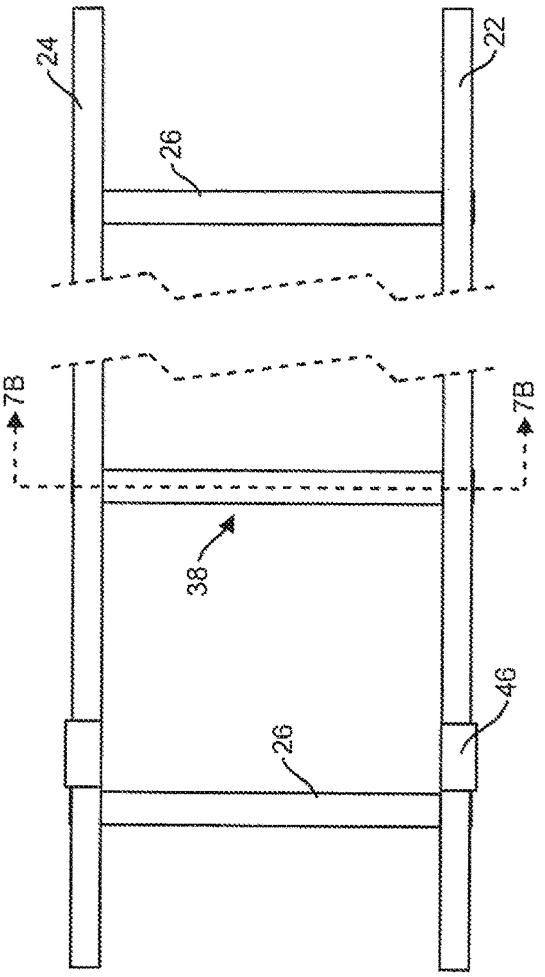
FIG. 7A is an overhead view of a portion of an extension ladder of the present invention.
Figure 7B:
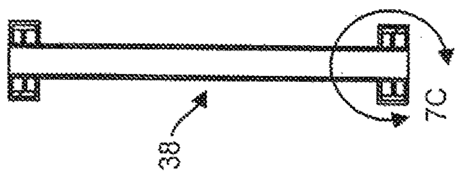
FIG. 7B shows a fly rung of FIG. 7A.
Figure 7C:
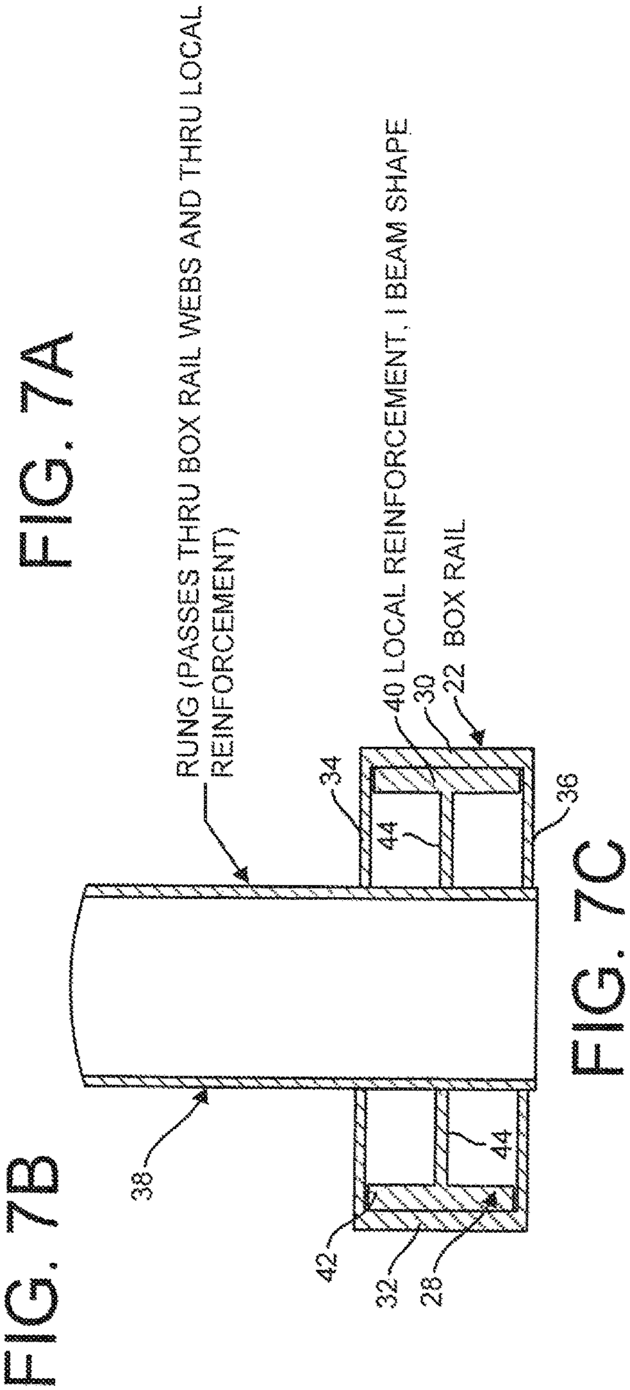
FIG. 7C shows a cross-sectional view of FIG. 7B.
Figure 8A:
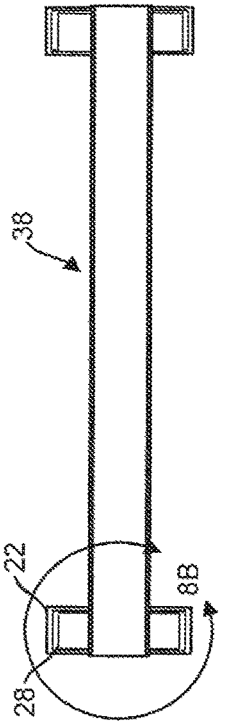
FIG. 8A shows a fly rung of an extension ladder having C shaped reinforcements.
Figure 8B:
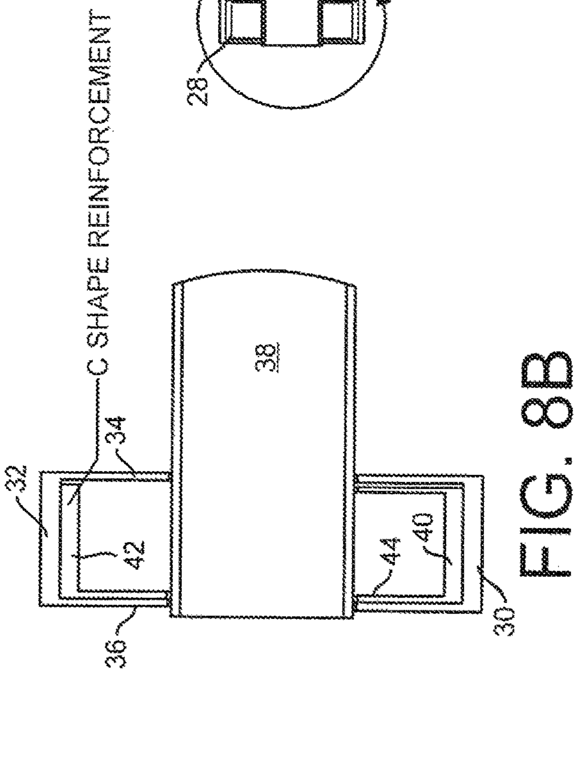
FIG. 8B is a cross-sectional view of FIG. 8A.
Figure 9A:
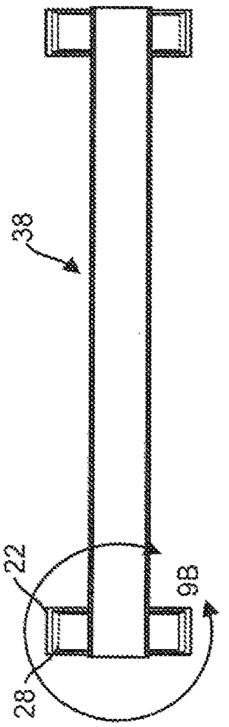
FIG. 9A shows a fly rung of an extension ladder having box shaped reinforcements.
Figure 9B:
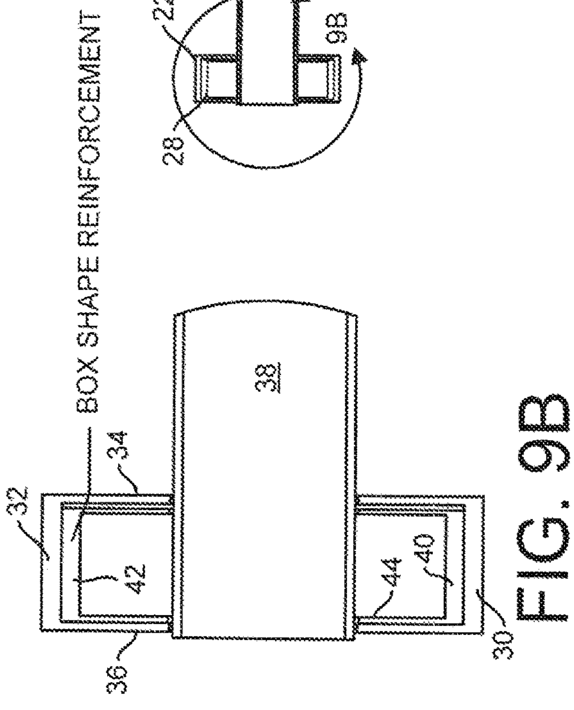
FIG. 9B is a cross-sectional view of FIG. 9A.

The local reinforcement 28 may be made of metal such as extruded aluminum or of a polymer. If a polymer is used, most likely some percentage of glass fiber filling would be required for adequate strength and elastic modulus. FIG. 5. shows an example of what a local reinforcement molded using a glass-filled polymer such as Rynite 545 might look like.

In general, the local reinforcement 28 must have a great enough strength and high enough modulus of elasticity to reduce the maximum bending moment which the rail must support to the point that the rail will not break in the Ultimate Load test. In other words, the local reinforcement must carry some of the bending moment which the ladder experiences.

Additionally, the local reinforcement 28 must be long enough to reach point D seen in FIG. 2. Point D is the location where the bending moment on the rail during Ultimate Load testing is just less than the bending moment that would break the rail. The bending moment at point D is ((F×L2)/L1)×A, where L4 is the distance to D from B. Thus, the local reinforcement 28 having the proper length reduces the bending moment experienced by the rail only where it is required to prevent the rail from breaking.

In order to determine where "D" is, L4 needs to be calculated.

In general, the bending moment at "D" is: Moment=((F×L2)/L1)×L4

To not exceed a maximum moment at "D", called Moment Max, which is known, then: Moment Max=((F×L2)/L1)×L4.

Solving for L4: L4=(Moment Max)/((F×L2)/L1)

L4 above is the position of "D" such that the Moment Max is not exceeded when a load F is applied to the ladder. The reinforcement therefore needs to be long enough to reach point "D" to keep the ladder from breaking under a load F.

Referring to FIG. 2A, when the test load F is applied as shown, the extension ladder 10, which is in the fully extended position and supported at about the bottom end at point A and at about the top end at point B, bows downward under the load F, which is in the direction toward the bottom of the paper. As the right fly rail 22 bows down, the bottom flange of the right fly rail 22 presses against the bottom flange of the right local reinforcement 28, because the bottom flange of the right fly will is effectively being bent upwards under the action of the load F bowing the ladder downwards. The force from the load F is transmitted from the bottom flange of the right fly rail 22 to the bottom flange of the right local reinforcement 28, as the bottom flange of the right fly rail 22 presses against the bottom flange of the right local reinforcement 28. The transmitted force to the bottom flange of the right local reinforcement 28 is further transmitted from the bottom flange of the right local reinforcement 28 to the middle portion of the right local reinforcement 28 to which the bottom flange of the right local reinforcement 28 is attached. In turn, this transmitted force through the middle portion is further interned transmitted to the top flange of the right local reinforcement 28 to which the middle portion is attached. The transmitted force is still further transmitted from the top flange of the right local reinforcement 28 to the top flange of the right fly rail 22 against which the top flange of the right local reinforcement 28 is pressing against because the right fly rail 22 is effectively being bent up under the load F. In this way, the load F on the bottom flange of the right fly rail 22 is dissipated and lessened on the bottom flange of the right fly rail 22 as it is transmitted through the right local reinforcement 28 and to the top flange of the right fly rail 22.

Additionally, it should be noted that the presence of the right base guide bracket 48 in contact with the right fly rail 22 effectively creates a hard corner about which the portion of the right fly rail 22 of distance L3 to the right of point C bends, creating the location of the greatest bending moment on the right fly rail 22. While the right base rail 14 and the right fly guide bracket 46 appear symmetric to the right fly rail 22 and the right base guide bracket 48, because the right base rail 14 is below the right fly rail 22, the bending moment created on the right base rail 14 at the right fly rail 22 guide bracket is less than the bending moment created at point C, and is not great enough to cause the right base rail 14 to fail.

It should be noted that besides an I cross-section, a C cross-section or a box cross-section can effectively serve as a local reinforcement. What is important is that there is a bottom surface on the local reinforcement against which the force can be transmitted from the lower flange of the rail and a top surface through which the transmitted force can be transmitted to the top flange of the rail, and of course a structural center portion between the top surface and the bottom surface so the force can be transmitted from the bottom surface to the top surface and thus to the top flange of the rail. The local reinforcement disposed in the rail does not have to be attached or contacting the top and bottom surface when the rail is not subject to loads. The local reinforcement should fit snugly in the rail so when the rail is subject to a load F, as described here, the top surface of the local reinforcement does contact the top flange of the rail and the bottom surface of the local reinforcement does contact the bottom flange of the rail so the force can be transmitted therebetween.

Figure 10:
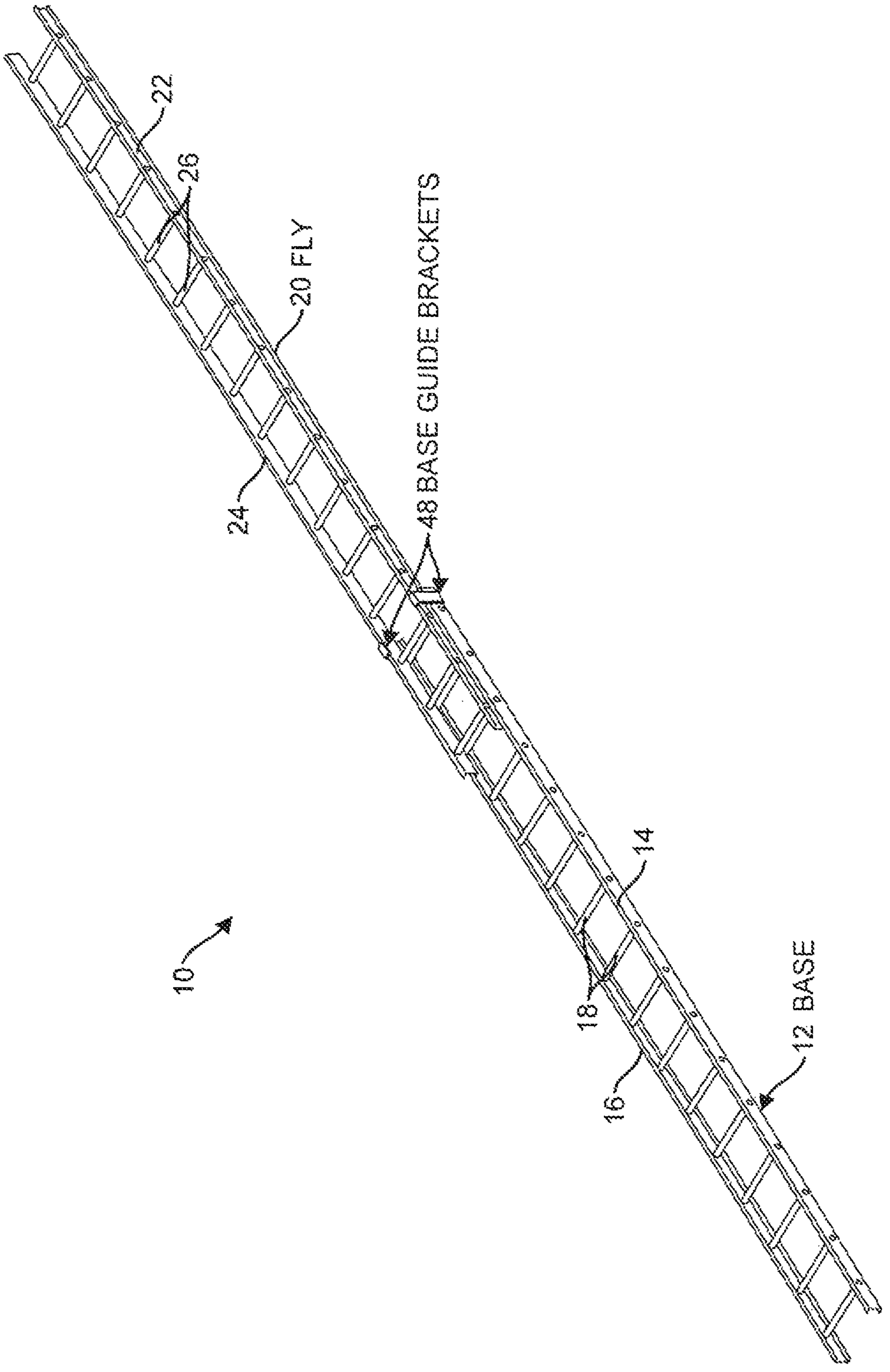
FIG. 10 shows an extension ladder having C profile rails and with local reinforcements.
Figure 11:
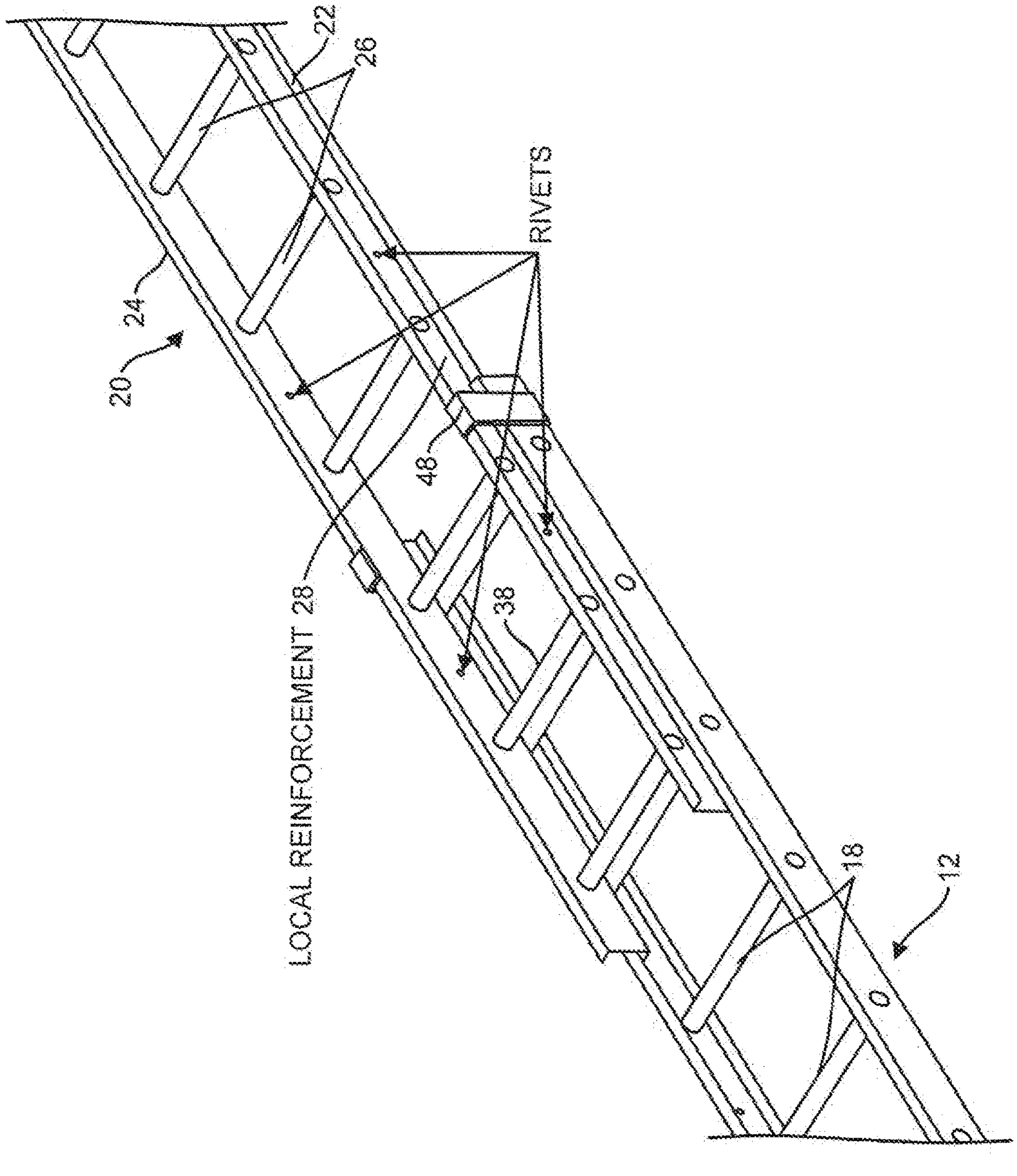
FIG. 11 is a closeup showing the local reinforcement nested within the ladder rail profile.
Figure 12:
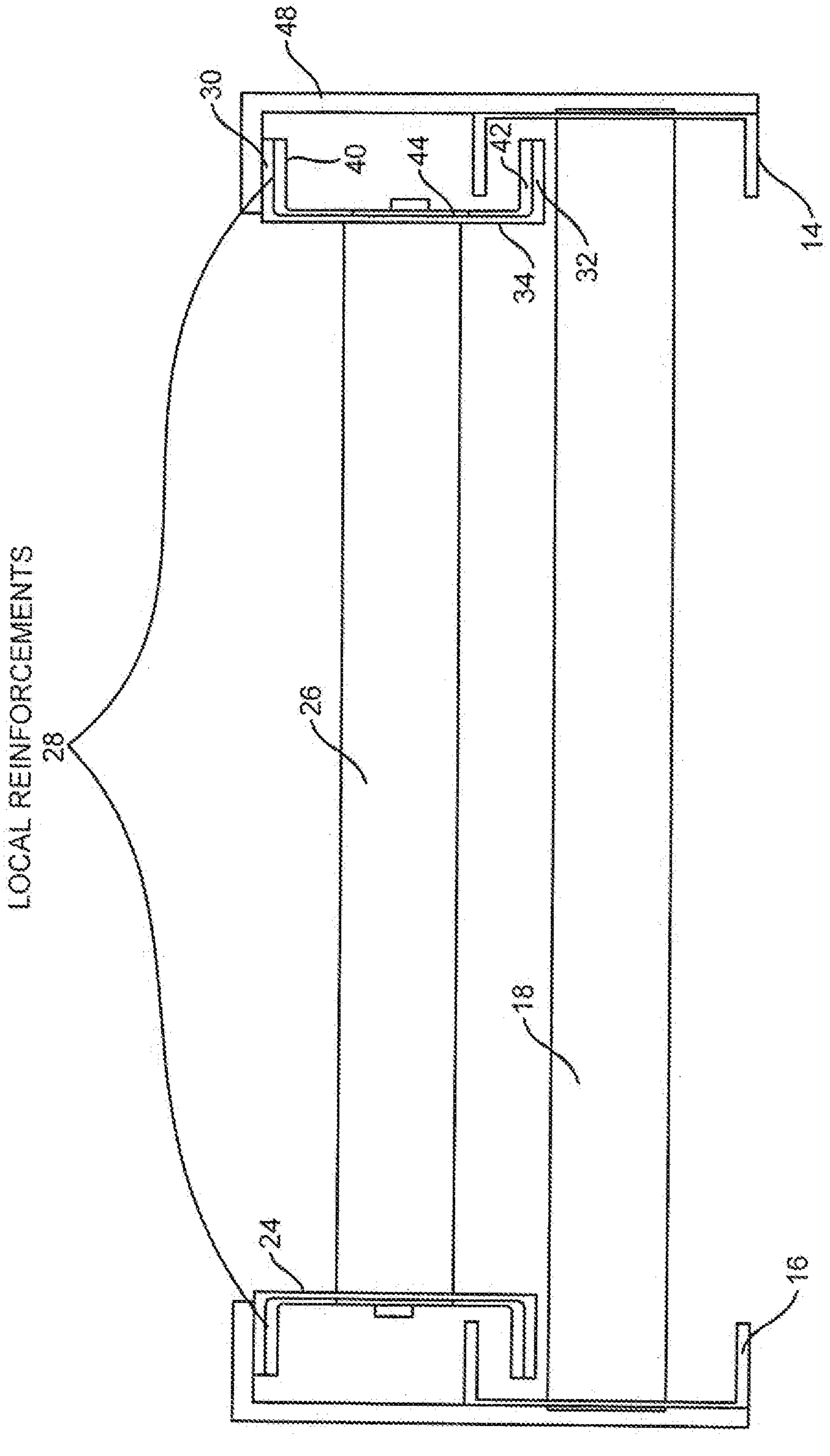
FIG. 12 is an end view showing how the reinforcements fit within the C rail profiles.
Figure 13:
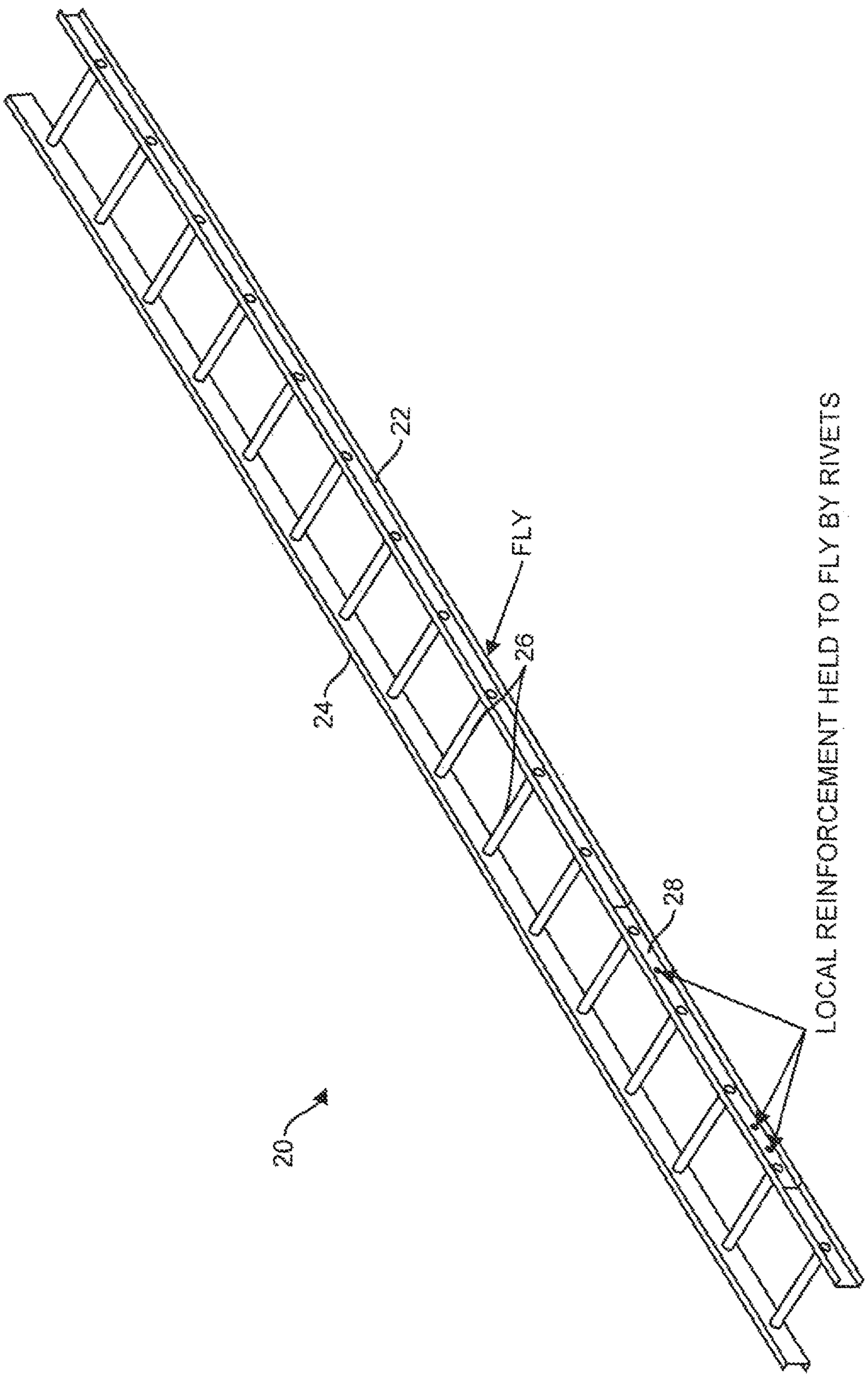
FIG. 13 shows just the fly with the reinforcements riveted in place.
Figure 14A:
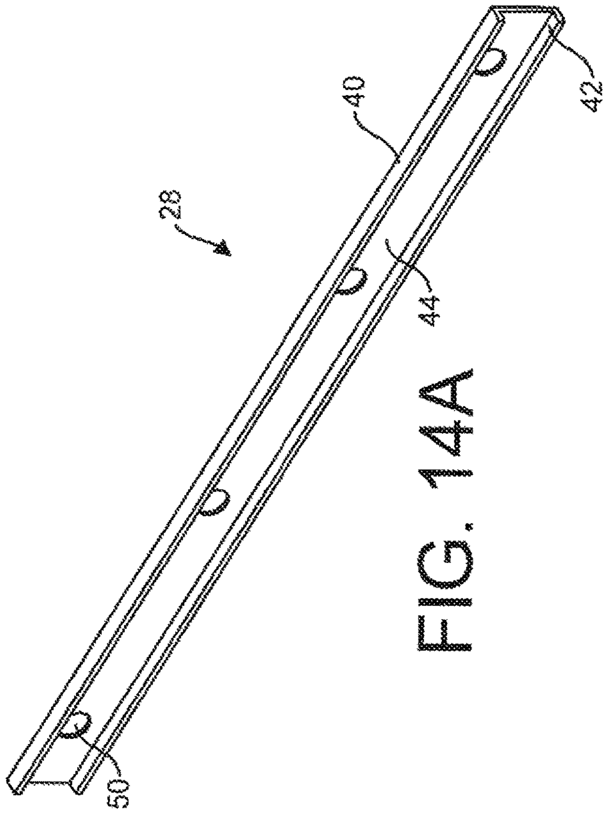
FIGS. 14A-14C show perspective, edge and side views, respectively of a local reinforcement for a C shaped profile.
Figure 14B:
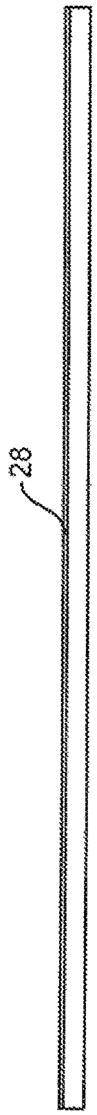
Figure 14C:
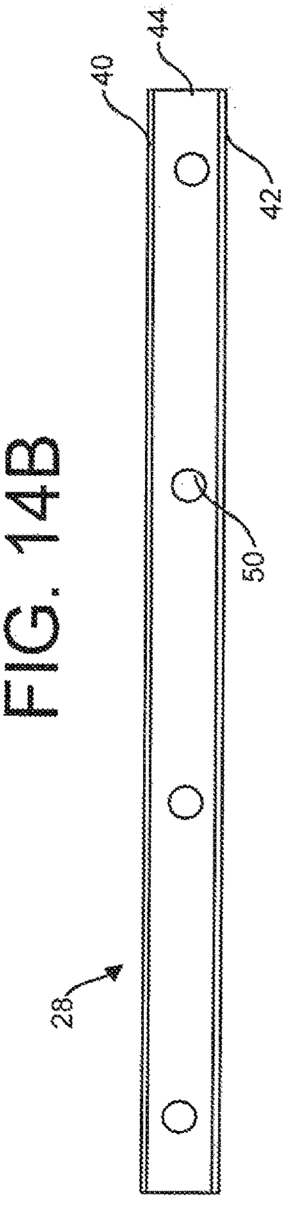

FIG. 10 shows an extension ladder having C profile rails and with local reinforcements. Feet and locks are not shown. There are no fly guide brackets because the rails interlock, as seen in FIG. 12. Generic rung to rail connections are shown which could be Alflo, or beaded-swaged, or rung plate connections. FIG. 11 is a closeup showing the local reinforcement nested within the ladder rail profile. Rivets are pointed out which serve to retain the local reinforcement in position. FIG. 12 is an end view showing how the reinforcements fit within the rail profiles. FIG. 13 shows just the fly with the reinforcements riveted in place. Distinct rivets are shown so there is no need to depend on the rung Alflo joints, or rung plate rivets, etc., to retain the reinforcements, although if no rivets are used, then the reinforcements can be maintained in place with them. FIGS. 14A-14C show a local reinforcement. It has a C shaped profile. The holes are to provide clearance around whatever part of the rungs protrude through the rail webs. The mechanics and mathematics governing how far the reinforcement needs to extend toward the upper end of the fly are the same as for the box rail and the thickness for the right top flange 40, right bottom flange 42 and center element 44 of the local reinforcement are the same as for the box rail.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An extension ladder comprising:

a base section having a first base rail and a second base rail in parallel and a spaced relation with the first base rail, and a plurality of base rungs extending between the first base rail and the second base rail;

a fly section having a first fly rail and a second fly rail in parallel and a spaced relation with the first fly rail, and a plurality of fly rungs extending between the first fly rail and the second fly rail;

wherein the first base rail, the second base rail, the first fly rail, and the second fly rail are box rails having a substantially hollow cross-section;

a first reinforcement disposed within the substantially hollow cross-section of the first fly rail and a second reinforcement disposed within the substantially hollow cross-section of the second fly rail, and extending less than an entire length of the fly section and the first and second reinforcements spanning at least two but less than all of the plurality of fly rungs, wherein the first reinforcement and second reinforcement are strengthening ribs secured within a respective one of the first fly rail and the second fly rail; and guide brackets attached to the base section engaging at least a portion of the base section and a portion of the fly section and permitting the fly section to slide relative to the base section;

wherein the first reinforcement includes at least a first rung opening and a second rung opening, wherein the first rung opening of the first reinforcement receives a first portion of a fly rung of the plurality of fly rungs and the second reinforcement includes at least a first rung opening and a second rung opening, wherein the first rung opening of the second reinforcement receives a second portion of the fly rung of the plurality of fly rungs to secure the first reinforcement and the second reinforcement relative to the first fly rail and the second fly rail.

2. The extension ladder of claim 1 wherein the first reinforcement and second reinforcement comprise a first flange and a second flange with a center element therebetween, wherein the first flange and the second flange of the first and the second reinforcement abut the substantially hollow cross-section of the respective first fly rail and the second fly rail.

3. The extension ladder of claim 2 wherein portions of the fly rung of the plurality of fly rungs extends through a web in the first fly rail and the second fly rail.

4. The extension ladder of claim 1 wherein the first reinforcement is further secured to the substantially hollow cross-section of the first fly rail via a first plurality of rivets and the second reinforcement is further secured to the substantially hollow cross-section of the second fly rail via a second plurality of rivets.

5. The extension ladder of claim 1 wherein the guide brackets include a first base guide bracket attached to the first base rail and the first base guide bracket engages at least a portion of the first fly rail.

6. The extension ladder of claim 1 wherein the first reinforcement and the second reinforcement are between 30 inches and 50 inches long and wherein the first and second rung openings of the first and second reinforcement secure the first and second reinforcements, the first and second fly rails, and the fly rung of the plurality of fly rungs relative to one another.

7. The extension ladder of claim 6 wherein the first fly rail is a 3-inch box rail and the extension ladder is either a 28-foot type IAA ladder or a 32-foot type IA ladder, or a 3.5-inch box rail and the extension ladder is a 32-foot type IAA ladder.

8. The extension ladder of claim 1 wherein the first and the second reinforcements further comprise an I-shaped cross section.

9. The extension ladder of claim 1 wherein the first and the second reinforcements further comprise a C-shaped cross section.

10. The extension ladder of claim 1 wherein the first and the second reinforcements further comprise a box-shaped cross section.

11. The extension ladder of claim 1 wherein the first reinforcement and the second reinforcement are further secured within the first fly rail and the second fly rail via a friction-fit inside the substantially hollow cross-section of the first fly rail and the second fly rail via a top flange and a bottom flange of the first and the second reinforcements.

12. The extension ladder of claim 1 wherein the first reinforcement and the second reinforcement are discrete elements that are disposed along the first fly rail and the second fly rail adjacent an end thereof.

13. An extension ladder comprising:

a base section having a first base rail and a second base rail in parallel and a spaced relation with the first base rail, and a plurality of base rungs extending between the first base rail and the second base rail;

a fly section having a first fly rail and a second fly rail in parallel and a spaced relation with the first fly rail, and a plurality of fly rungs extending between the first fly rail and the second fly rail;

wherein the first base rail, the second base rail, the first fly rail, and the second fly rail are box rails having a substantially hollow cross-section;

a first reinforcement disposed within the substantially hollow cross-section of the first fly rail and a second reinforcement disposed within the substantially hollow cross-section of the second fly rail and the first and second reinforcements spanning at least two of the plurality of fly rungs but less than an entire length of the fly section, wherein the first reinforcement and second reinforcement are separate pieces that are secured within the first fly rail and the second fly rail respectively, the first reinforcement and the second reinforcement including a first flange, a second flange and a center element therebetween; and guide brackets attached to the base section engaging at least a portion of the base section and a portion of the fly section and allowing the fly section to slide relative to the base section, wherein the first reinforcement includes at least a first rung opening and a second rung opening disposed in the center element thereof, wherein the first rung opening of the first reinforcement receives a first portion of a fly rung of the plurality of fly rungs and the second reinforcement includes at least a first rung opening and a second rung opening, wherein the first rung opening of the second reinforcement receives a second portion of the fly rung of the plurality of fly rungs to secure the first reinforcement and the second reinforcement relative to the first fly rail and the second fly rail.

14. The extension ladder of claim 13 wherein the first and the second reinforcements further comprise an I-shaped cross section.

15. The extension ladder of claim 13 wherein the first and the second reinforcements further comprise a C-shaped cross section.

16. The extension ladder of claim 13 wherein the first and the second reinforcements further comprise a box-shaped cross section.

17. The extension ladder of claim 13 wherein the first reinforcement and the second reinforcement are further secured within the first fly rail and the second fly rail via a friction-fit inside the substantially hollow cross-section of the first fly rail and the second fly rail via the first flange and the second flange of the first and the second reinforcements.

* * * * *